Jan. 22, 1952     R. A. KAPLAN     2,583,147
ROTARY IMPACT TOOL
Filed Feb. 1, 1949
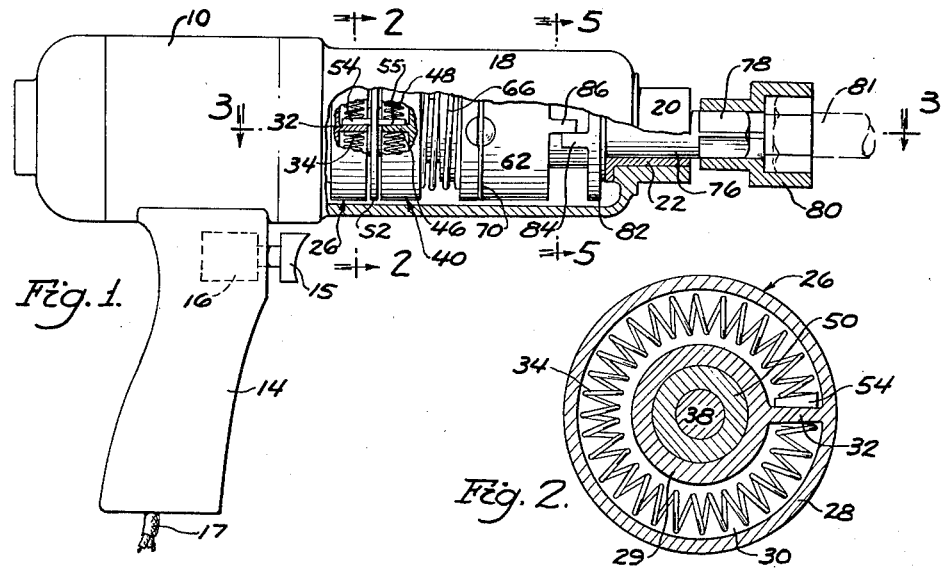
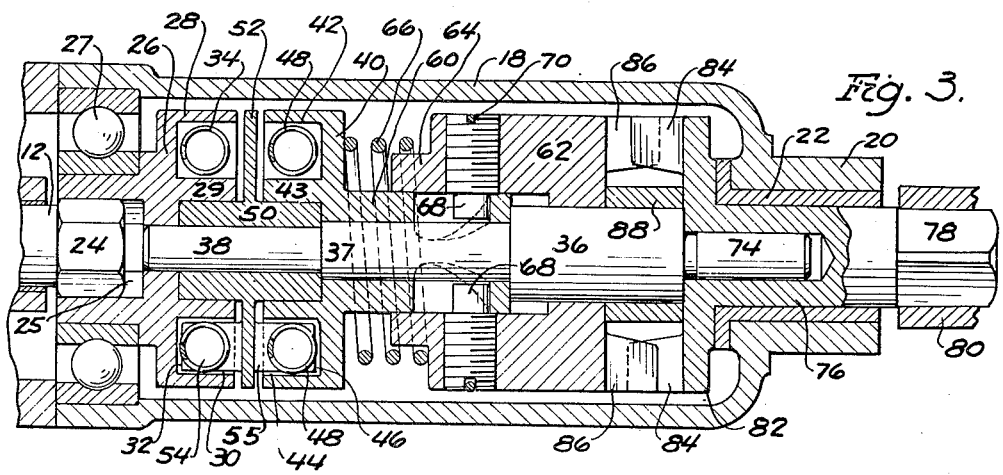
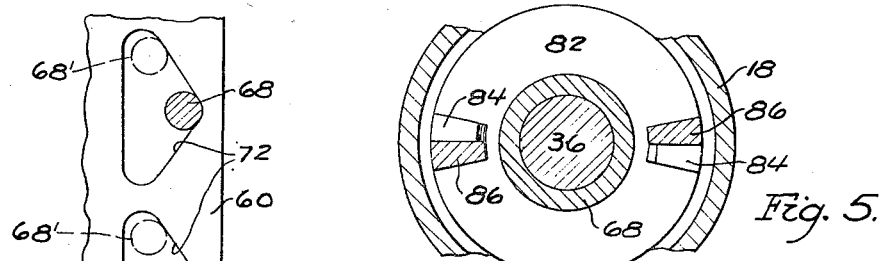
INVENTOR.
Reuben A. Kaplan
BY
A. R. McGrady
ATTORNEY.

Patented Jan. 22, 1952

2,583,147

UNITED STATES PATENT OFFICE 2,583,147

ROTARY IMPACT TOOL

Reuben A. Kaplan, Owatonna, Minn.

Application February 1, 1949, Serial No. 73,955

7 Claims. (Cl. 192—30.5)

This invention relates to a device for driving threaded securing elements such as nuts, bolts and screws, and more particularly to a motor operated nut runner employing impact to enable the tool to exert a high torque under certain operating conditions.

The invention makes use of energy accumulating means combined with a torque responsive clutch to convert the relatively uniform rotation of a prime mover such as an electric motor into a series of intermittent rotational blows imparted to the nut or other member to be driven.

An object of the invention is to provide a tool of the character indicated which is of improved operating characteristics, sturdy and dependable in use, and easily manufactured and serviced.

A further object of the invention is to provide a tool wherein the operator of the tool is subjected to a minimum of torque reaction upon impact.

A further object of the invention is to provide a tool which will deliver blows of substantially uniform intensity in either a right hand or a left hand direction.

Further objects and advantages of the invention will be apparent from the following description, taken in connection with the appended drawing, in which:

Fig. 1 is a view in side elevation, with parts broken away, of a tool embodying the invention.

Fig. 2 is an enlarged sectional view taken on the line 2—2 of Fig. 1.

Fig. 3 is an enlarged sectional view taken on the line 3—3 of Fig. 1.

Fig. 4 is a sectional view constituting a development of the cam mechanism.

Fig. 5 is a sectional view taken on the line 5—5 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The tool shown in the drawing comprises a housing 10 which houses a reversible motor of any suitable type, such as an electric motor or a compressed air motor, operating to rotate a shaft 12, through reduction gearing or otherwise. The housing 10 is supported by means of a hand grip 14 having a trigger 15 which controls the motor, as by means of a switch or a valve, indicated schematically at 16. The motor is supplied with energy through a conduit 17.

Forwardly of the housing 10 and fixed thereto is a cylindrical casing 18, having its forward end 20 reduced to retain a bushing or bearing 22, for a purpose to be described.

The forward end of the motor shaft 12 is of hexagonal or other non-circular form, as indicated at 24, and is non-rotatably fitted within the mating socket 25 of a rotary driving member 26, which is mounted in a bearing 27 at the rear of casing 18. The member 26 has outer and inner flanges 28, 29 which form an annular channel 30 having a radial abutment 32 therein, against which abuts one end of a toric spring 34.

A spindle 36 is mounted axially of the casing 18 and has a reduced portion 37 and a further reduced portion 38, the latter being rotatably seated in an axial bore in member 26.

Forwardly of driving member 26 is a driven member 40 which has outer and inner flanges 42, 43 which form an annular channel 44 having a radial abutment 46 therein against which abuts one end of a toric spring 48. The adjacent portions of driving member 26 and driven member 40 are thus substantially mirror images of each other.

Rotatably mounted on the reduced portion 38 of spindle 36 is a floating hub 50 having a circular flange 52 extending radially therefrom and carrying two impellers 54, 55 extending rearwardly and forwardly therefrom and overlying the abutments 32 and 46 as shown in Fig. 1.

The function of the floating hub 50 and its associated mechanism above described is to transmit a yielding torque in either direction from the motor shaft 12 to the driven member 40. Thus if the motor is driven in a clockwise direction as viewed from the left of Fig. 1, shaft 12 will drive member 26 positively in the same direction, compressing spring 34 and yieldingly urging the floating hub 50 in the same direction. Rotation of hub 50 will be positively transmitted through impeller 55 and abutment 46 to driven member 40. Member 40 may lag behind hub 26 by an amount equal to the distance between abutment 32 and impeller 54 due to the compression of spring 34. If shaft 12 is driven in the counter-clockwise direction, abutment 32 will act through impeller 54 to drive hub 50 positively in the counter-clockwise direction, and the rotation of hub 50 will be yieldingly transmitted through abutment 46 to member 40, which will lag behind the member 26 by the amount of compression of spring 48. As member 40 meets increased resistance to movement in the direction in which it is being driven, the spring 34 or 48 which is being compressed will be compressed the more until a point is reached where its coils contact each other, from which point on the arrangement acts as a positive drive.

The forward portion of driven member 40 is formed as a cylindrical collar 60 and is rotatably mounted on the reduced portion 37 of spindle 36. Rotatably and slidably mounted on the unreduced portion of spindle 36 is a hammer 62 comprising a bored generally cylindrical member having a rearwardly extending sleeve 64 which rotatably and slidably engages the exterior of collar 60, the two being urged away from each other by a stiff compression spring 66 which acts as an accumulator spring.

A pair of opposed cam followers 68 are mounted in the walls of hammer 62, being formed with threaded shanks which seat in bores in the hammer and are held against rotation by wire 70 which encircles the hammer 62 as shown in Fig. 1. The cam followers 68 engage opposed cam surfaces 72 formed by apertures in the walls of collar 60, as shown in developed form in Fig. 4.

Mounted forwardly of hammer 62, and rotatable on an extension 74 of spindle 36 in the bushing 22, is a work-engaging wrench head 76 having at its forward end a socket-engaging projection 78 of polygonal cross section designed to fit into a correspondingly shaped opening in a wrench socket 80 for the driven bolt or nut, indicated at 81. Alternatively, the projection 78 may be formed to directly engage the nut, bolt or screw, but the arrangement shown makes the tool adaptable for different types and sizes of work. The rear end of head 76 is formed as a radial plate 82 on which are formed opposed anvil lugs 84 designed to be struck by striker lugs 86 formed on the forward surface of hammer 62. In order to limit the forward movement of the hammer 62, a sleeve 88 is mounted on spindle 36 intermediate the hammer and the head 76.

The operation of the illustrated embodiment of the invention will now be described. Assume that the parts are in the position shown in the drawing, with the socket 80 in engagement with the member to be driven. The motor is started, to cause rotation of the drive shaft 12 in the clockwise direction as viewed from the left of Fig. 1. This will act through driving member 26, floating hub 50, driven member 40, cam surfaces 72, cam followers 68, hammer 62, striker lugs 86, and anvil lugs 84 to rotate the head 76 at the same speed as shaft 12. Until the nut approaches its seat it offers little resistance to rotation, and the parts remain in the same relative positions as shown in the drawing, except that the slight reaction due to friction between the nut and bolt may cause abutment 32 to move away from impeller 54 by a few degrees, correspondingly compressing spring 34.

As the driven nut reaches its seat, rotation of the wrench head 76 is retarded or temporarily arrested. Spring 34 is thereupon compressed to the point where its coils are in contact with each other, after which it acts as a positive drive member. Further rotation of the drive shaft 12 relative to the head 76 causes cam surfaces 72 to rotate relative to cam followers 68, causing the latter to ride upwardly on the cam surfaces toward the positions indicated at 68' in Fig. 4, thereby compressing the accumulator spring 66 and drawing the hammer 62 rearwardly. When the torque reaction has increased to a predetermined amount, this action will proceed to the point where the striker lugs 86 will be moved out of engagement with the lugs 84, whereupon the hammer 62, being free, will rotate and also move forward under the influence of cam surfaces 72 and accumulator spring 66. Spring 66 and cam surfaces 72 with their followers 68 thus form a resilient coupling between the driven member 40 and the hammer 62, which converts the accumulated potential energy of spring 66 into kinetic energy in the form of angular velocity of the hammer 62. When the hammer has thus rotated freely through approximately 180° in this manner, the lugs 86 will strike lugs 84 and impart a rotary blow thereto in the clockwise direction. At the instant the blow is delivered, the parts are again in approximately the positions shown in the drawing. Continued application of power will again compress the spring 66, declutching the lugs 84 and 86 and producing a series of blows in rapid succession. In this operation, the toric springs 34 and 48 operate to cushion the shock of the reaction transmitted from the hammer mechanism to the operator via hand grip 14.

By reason of the structure above described, the force of the successive blows is substantially uniform, and the number of blows is therefore an indication of the tightness of the nut. When a predetermined number of blows has been delivered by the tool, the operator releases trigger 15 to cut off the power, and disengages the tool from the work.

The invention is suitable for driving elements having either right or left hand threads and for either tightening or loosening the threaded elements. It will be seen that all of the drive elements are symmetrically arranged and are adapted to operate from either direction. The impacting faces of lugs 84 and 86 lie in radial planes, which insures that the blow is evenly distributed over their surfaces irrespective of the direction of rotation. The reaction developed by the successive blows and releases of the hammer 62 is to a considerable extent mitigated by the toric springs 34 and 48, and to this extent is not transmitted to the operator.

Although the invention has been described with reference to a particular embodiment thereof, it may be embodied in other forms within the skill of artisans in this art, and is not limited except in accordance with the terms of the following claims.

I claim:

1. An impact wrench comprising a drive shaft and a spindle, a hammer rotatable and reciprocable on said spindle, and connecting means between the shaft and the hammer comprising a hub rotatable on the spindle, a yielding connection between the shaft and the hub, a driven member rotatable on the spindle, a positive connection between the hub and the driven member, a cam connection between the driven member and the hammer operative upon relative rotation therebetween to move the hammer longitudinally of the spindle, and an accumulator spring stressed by such longitudinal movement of the hammer.

2. An impact wrench or the like comprising a drive shaft and a spindle, a hammer rotatable and longitudinally slidable on said spindle, and a connection between the drive shaft and the hammer including a hub rotatable on the spindle, a resilient connection between the shaft and the hub, a driven member rotatable on the spindle, an unyielding connection between the hub and the driven member, and a resilient coupling between the driven member and the hammer operative upon relative rotation therebetween to move the hammer longitudinally of the spindle and operative when released to deliver energy to the hammer.

3. An impact wrench or the like comprising a drive shaft and a spindle, a hammer rotatable and longitudinally movable relative to said spindle, a hub rotatable relative to said shaft, a resilient connection between the shaft and the hub, a driven member rotatable relative to the spindle, an unyielding connection between the hub and the driven member, and a resilient coupling between the driven member and the hammer operative upon relative rotation therebetween to move the hammer longitudinally of the spindle and to store potential energy and operative upon release to deliver such energy to the hammer.

4. The invention defined in claim 3, wherein said resilient connection comprises two toric springs becoming selectively operative when the drive shaft rotates in different directions.

5. The invention defined in claim 3, wherein said resilient coupling comprises an accumulator spring compressed by movement of the hammer longitudinally of the spindle.

6. An impact wrench or the like comprising a drive shaft, a hammer rotatable and longitudinally movable relative to said shaft, a hub rotatable relative to said shaft, means for positively preventing longitudinal movement of the hub relative to said shaft, a resilient connection between the shaft and the hub, a driven member rotatable relative to said shaft, an unyielding connection between the hub and the driven member, and a resilient coupling between the driven member and the hammer comprising cam elements on the driven member and the hammer and a compression spring compressed by operation of said cam elements, said coupling being operative upon relative rotation between the driven member and the hammer to move the hammer longitudinally relative to the shaft and to store potential energy in the spring and operative upon disengagement of said cam elements to impart rotational energy to the hammer.

7. An impact wrench or the like comprising a drive shaft, a hammer rotatable and longitudinally movable relative to said shaft, a hub rotatable relative to said shaft but restrained from longitudinal movement relative thereto, a resilient connection between the shaft and the hub comprising a toric compression spring, a driven member rotatable on said shaft, an unyielding connection between the hub and the driven member, and a resilient coupling between the driven member and the hammer operative upon relative rotation therebetween to move the hammer longitudinally relative to the shaft and to store potential energy and operative upon release to deliver such energy to the hammer.

REUBEN A. KAPLAN.

REFERENCES CITED

The following references are of record in the file of this patent:

UNITED STATES PATENTS

| Number | Name | Date |
| --- | --- | --- |
| 1,855,436 | Miller | Apr. 26, 1932 |
| 2,061,843 | Meunier | Nov. 24, 1936 |
| 2,126,673 | Smith, Jr. | Aug. 9, 1938 |
| 2,158,303 | Pott | May 16, 1939 |
| 2,461,571 | Robinson | Feb. 15, 1949 |